A. P. Hughes,
Dovetailing Machine,
Nº 10,548. Patented Feb. 21, 1854.

UNITED STATES PATENT OFFICE.

AMOS P. HUGHES, OF PHILADELPHIA, PENNSYLVANIA.

TOOL FOR DOVETAILING.

Specification of Letters Patent No. 10,548, dated February 21, 1854.

*To all whom it may concern:*

Be it known that I, AMOS P. HUGHES, of the city and county of Philadelphia and State of Pennsylvania, have invented a new and useful Machine for Dovetailing; and I do hereby declare that the following is a full, clear, and exact description of the construction and operation of the same, reference being had to the annexed drawings, making a part of this specification, in which—

Figure 1:
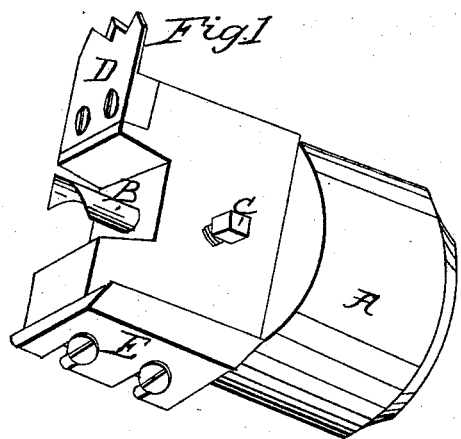
Figure 2:
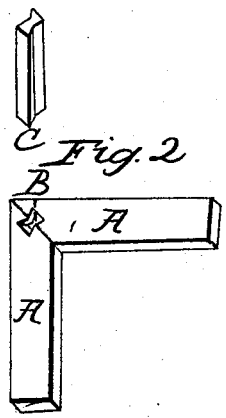

Figure 1 is a perspective view of the machine, and Fig. 2 a perspective view of the manner of making a dove-tail joint.

In Fig. 1, (A) is a chuck upon whose inner extremity a screw is cut by which it is firmly secured to a mandrel from which it receives motion. In the center of a recess or offset in the outer extremity of this chuck a spiral dove tail bit (B) is inserted, so shaped as to cut a dove tail groove or notch when made to revolve. This bit is firmly held in position by a screw nut (C), which allows the bit to be removed and replaced by one of different size. It also permits the bit to be moved a little in or out of the opening in which it is inserted, by which grooves of different depths may be cut by the same bit. The spiral form of the bit relieves it from the chips, which would otherwise choke it, and effectually prevent its operation.

To the outer surface of the chuck and at right angles with the bit, a section of a saw (D) is securely attached, which serves to cut mitered or squared edges, according to the angle at which the wood is presented to it. By using but a small section of a saw there will be less liability of its springing, which will insure the edge being cut perfectly true throughout, upon which the accuracy of the joint will evidently depend.

Upon the side of the outer extremity of the chuck directly opposite and at right angles with the saw, a plane iron (E) is attached, which serves to dress off the surplus wood immediately after the edge has been cut. The width of the saw should be such, as that the teeth should extend a little beyond or outside of a circle described with the bit as a center and with a radius equal to the distance between the bit and the cutting edge of the plane iron, by which arrangement the saw first comes into contact with the wood. The plane iron then removes the surplus wood which allows the bit to cut the groove. As soon as the bit enters the wood these three operations, viz:—cutting, dressing and grooving are performed simultaneously. The wood to be dove-tailed is supported by a movable frame, upon which it is placed at any required angle. The feed motion by this frame may be effected either by hand or by suitable machinery. Mitered or squared edges without grooves may be cut by this machine by simply removing the bit.

Two pieces of wood (A—A Fig. 2) having been mitered and grooved, a joint is made in the following manner: The mitered edges are directly brought into contact with each other, and as both are merely grooved a double dove tail opening (B) will be left in the center of the joint. A key (C) of corresponding shape is then driven into this opening which firmly locks both pieces.

The superiority of this method over that commonly used is that in the latter by sliding one piece over another a portion of glue is forced out which impairs the strength of the joint. Another advantage of my method is that the dove tail can be made so as only to be perceptible at one extremity, which adds much to the appearance of unveneered wood. This is done by not grooving each piece its full length, thus leaving a small portion merely mitered, which will conceal the key. Another and important advantage is that pieces may be separately veneered and dressed before being dove tailed and jointed, which facilitates the work, economizes time and labor, and insures a neater finish.

I am aware that the several parts above described are old and I do not therefore claim them; but What I do claim as my invention and desire to secure by Letters Patent is—

The arrangement and combination of the chuck, bit, saw, and plane iron, or their equivalents, substantially in the manner and for the purposes as hereinbefore specified.

A. P. HUGHES.

Witnesses:
JOHN T. CLEMENS,
ARMON DAVIS.